J. D. EGLESTON.
Bee Hive.
No. 16,474.
Patented Jan. 27, 1857.
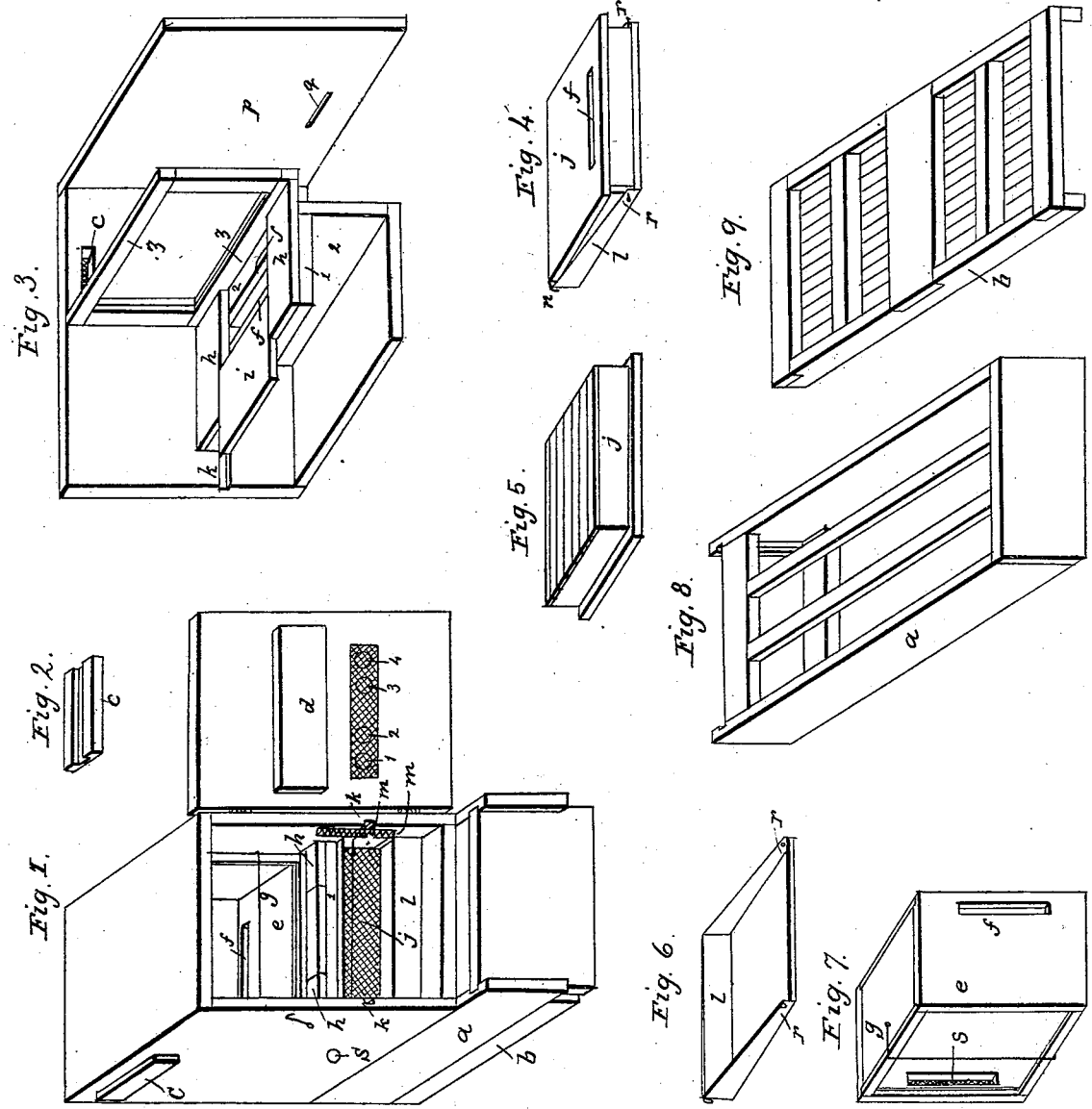

UNITED STATES PATENT OFFICE.

JERESIAH D. EGLESTON, OF CANAAN, CONNECTICUT.

FEED-BOX OF BEEHIVES.

Specification of Letters Patent No. 16,474, dated January 27, 1857.

*To all whom it may concern:*

Be it known that I, JERESIAH D. EGLESTON, of Canaan, in the county of Litchfield, in the State of Connecticut, have invented a new and Improved Beehive for Feeding Bees; and I do hereby declare that the following is a full and exact description of the construction and operation of the same, reference being had to the annexed drawings, making a part of this specification, in which—

Figure 1 is a perspective view, Fig. 2 a view of the ventilator cap, Fig. 3 a view of the partitions; Fig. 4 the form of fastening the platter $l$ to the feed-box $j$; Fig. 5 is a view of the feed-box $j$ inverted; Fig. 6 a view of the platter $l$; Fig. 7 a view of the inside honey box; Fig. 8 a view of the bottom honey box; and Fig. 9 a view of the screen.

The letters $j$, $j$, $j$, show the feed-box; $k$, $k$, $k$, the grooves; $l$, $l$, $l$, the platter; $m$, the spring, $n$, $n$, $n$, the hooks, $o$, the nail fastening the upper end of the spring; $r$, $r$, $r$, $r$, the nails fastening the platter to the feed-box, and the holes in the platter through which they are put; and $f$, the passage.

The nature of my invention consists of an improvement in the feed-boxes of bee hives, for the purpose of keeping the feed on a level with the bottom of the feed-box; by means of a platter suspended with springs, as hereinafter described.

To enable others skilled in the art to make and use my invention I will proceed to describe its construction and operation.

The feed box is $8\frac{3}{4}$ inches long, $5\frac{1}{4}$ inches wide, and $1\frac{3}{4}$ inches deep in the clear, or any other convenient size. The top, back, and ends, are made of $\frac{1}{2}$ inch stuff, the top, is 11 inches long, and 6 inches wide, with a hole through it, $5\frac{1}{2}$ inches long, $\frac{1}{2}$ of an inch wide, in the middle $\frac{3}{4}$ of an inch from the back edge, or in any other convenient place. The bottom is made of slats $\frac{3}{4}$ of an inch wide and $\frac{1}{4}$ of an inch thick left about $\frac{3}{32}$ of an inch apart. And the front is covered with woven wire. This box is fitted to the hive by grooves in the sides of the hive close under partition No. 1, or in any other convenient manner. Make a tin platter 7 by 10 inches on the bottom or any other size suited to the feed box, with sides and ends turned up square, the front $1\frac{3}{4}$ inches, and the back $\frac{3}{8}$ of an inch deep, tapering the ends from the front to $\frac{3}{4}$ of an inch on the back. Make a hole in each of the upper back corners of the ends, and across the front edge run a wire turning down the ends for hooks. Fasten the platter to the feed box by driving nails through the holes in the corners of the platter into the ends of the back to the feed box, having the box set in the platter with a space $\frac{1}{8}$ of an inch between the back of the platter and the back of the feed box. Make two wire springs, of No. 23 brass wire, 2 inches long, or any other length or size that will balance the feed; by winding the wire around a piece of No. 10 wire, turning up 2 threads of the wire at both ends to form loops. Hitch one of the springs to one of the hooks on the platter and with an awl in the loop at the other end, raise the platter till it strikes the bottom of the feed box, there make a hole in the side of the hive, in both sides the same. Make 3 more holes 1 above and 2 below $\frac{3}{16}$ of an inch apart. Hitch on the springs and fasten with a nail in the second hole from the bottom.

*Manner of using.*—First hive the bees. Then keep feed in the platter at all times when the season or weather is unfavorable for gathering honey from flowers. Take away the boxes as soon as they are filled, and put empty ones in their places. Keep the buttons on the door open while feeding, and the filth and moths cleaned from under the screen. The advantages derived from using this hive, are, that a large amount of honey can be taken from the bees and leave enough for their support, and its conveniences for feeding. Being easily managed, without disturbing the bees, and secure from robbers, feeding can be done at any time without shutting up the bees.

What I claim as my invention and desire to secure by Letters Patent is—

The platter $l$, and wire-springs $m$, in combination with the feed-box $j$, as herein described.

Canaan, Litchfield county, Connecticut, Jan. 5th, 1857.

JERESIAH D. EGLESTON.

Witnesses:
DANIEL R. SPAULDING,
MILES T. GRANGER.